(12) United States Patent
Nakano

(10) Patent No.: US 7,150,034 B2
(45) Date of Patent: Dec. 12, 2006

(54) METHOD AND APPARATUS FOR NOTIFYING USERS OF FILTERED E-MAIL USING A SET TOP BOX

(75) Inventor: Masahiro Nakano, Los Altos, CA (US)

(73) Assignees: Sony Corporation (JP); Sony Electronics, Inc., Park Ridge, NJ (US)

(*) Notice: Subject to any disclaimer, the term of this patent is extended or adjusted under 35 U.S.C. 154(b) by 994 days.

(21) Appl. No.: 09/827,950

(22) Filed: Apr. 9, 2001

(65) Prior Publication Data

US 2002/0147988 A1    Oct. 10, 2002

(51) Int. Cl.
*H04N 5/445* (2006.01)
*H04N 7/173* (2006.01)

(52) U.S. Cl. ............... 725/110; 725/40; 725/114; 725/116; 725/134

(58) Field of Classification Search ............... 725/37, 725/40, 109, 110, 114, 116, 134; 709/217, 709/206, 231; 370/217
See application file for complete search history.

(56) References Cited

U.S. PATENT DOCUMENTS

| | | | |
|---|---|---|---|
| 6,253,238 B1* | 6/2001 | Lauder et al. | 709/217 |
| 6,373,817 B1* | 4/2002 | Kung et al. | 370/217 |
| 6,397,167 B1* | 5/2002 | Skinner et al. | 702/183 |
| 6,628,415 B1* | 9/2003 | Lawrence et al. | 358/1.15 |
| 6,708,205 B1* | 3/2004 | Sheldon et al. | 709/206 |
| 6,968,364 B1* | 11/2005 | Wong et al. | 709/217 |
| 2002/0053075 A1* | 5/2002 | Paz et al. | 725/10 |
| 2002/0092019 A1* | 7/2002 | Marcus | 725/37 |

* cited by examiner

*Primary Examiner*—Kieu-Oanh Bui
(74) *Attorney, Agent, or Firm*—Rader Fishman & Grauer PLLC; Ronald P. Kananen

(57) ABSTRACT

A software application that filters specific messages from an e-mail server is disclosed. A user specifies filtering criteria within the application, which then detects the arrival of an e-mail fulfilling the specified criteria, and notifies the user accordingly. The notification can consist of blinking an icon on a Set Top Box (STB) TV screen, making an audible sound, or activating a pager. The subject of the filter criteria can be an Instant Message or telephone call using Caller ID, instead of an e-mail message.

20 Claims, 9 Drawing Sheets

METHOD AND APPARATUS FOR NOTIFYING USERS OF FILTERED E-MAIL USING A SET TOP BOX

FIELD OF THE INVENTION

The present invention relates to the field of set top boxes (STBs). More particularly, the invention relates to STBs working with e-mail servers to provide notification to users of the arrival of selected e-mails.

BACKGROUND OF THE INVENTION

FIG. 1 is a representative block diagram of a conventional cable television (TV) system. A set top box (STB) 10 contains electronic equipment that is used to connect a subscriber's TV 12, and potentially other video electronic equipment, with a TV content provider 14. An STB 10 is essentially a rudimentary computer without floppy disc or CD ROM drives that is programmed to process programming and potentially other services from a provider 14. As shown in FIG. 1, STBs can be connected to a TV provider 14 via cable modem 16, satellite 18, or even broadcast antennae 20. Presently, the highest percentage of STBs 10 are connected to cable TV providers 14 through a coaxial wall outlet.

Services provided by a TV provider 14 typically include access to a number of TV channels and sometimes an electronic program guide. Additional premium channels may also be provided to subscribers at an additional fee. Pay-per-view events and video-on-demand may also be supplied by the TV provider 14. The STB 10 is programmed to furnish these and other services to the subscriber.

However, some TV providers also offer Internet access and e-mail accounts. Many different combinations of TV programming, web access, and e-mail services are commercially available.

One such combination of TV programming and web/e-mail access is shown in FIG. 2. Accessing such a service from the Internet Service Provider (ISP) 15 requires a STB 10, a conventional TV 12 to connect the STB 10, and a telephone line to sign up and access the service. As shown in FIG. 2, such an arrangement also includes a wireless keyboard 22 of the typical computer QWERTY style, an ordinary wireless remote controller 24 like that found with a TV 12, and a 56K modem 26. The keyboard 22 can be used by the user during operation of the STB 10. However, a substantial portion of the user-selectable options do not require use of the keyboard 22, and can be accomplished using the ordinary remote controller 24. The keyboard 22 is essential in setting up the STB 10 and selecting various options, but might go unused for long periods of time after set up. Also, during set-up, the TV 12 screen can show a display of a keyboard through which a user can designate letters using the ordinary remote controller 24.

When setting up the STB 10 and ISP 15 connections for the first time, users are asked a few questions so that the ISP can then detect the TV programming received from their local cable, broadcast, or satellite TV provider 14. However, the combination of TV programming and web/e-mail access from the ISP 15 does not replace these types of TV programming, but is an additional online service that is intended to enhance the television viewing experience, not supplant it. For example, a STB user can compete in real time with the contestants appearing on the quiz shows, and can have his or her score continually updated on a portion of the TV screen 12. The user can also compare the score with the scores of other STB quiz show players. Similarly, viewers of professional sports games can obtain detailed player statistics far beyond what is displayed by the TV network.

An additional Internet utility available using STBs is Instant Messaging, where messages from selected users can be displayed directly on the TV 12 connected to the STB 10. Another feature of Instant Messaging is that it allows users to control who can see when they are online and who can send them messages. However, these messages are not in a typical Internet e-mail format, and are only filterable to the extent that a user can add or delete persons from their "buddylist", or list of other people capable of sending instant messages. Also, if the Instant Messaging software application 28 is not enabled, a user will not know that another person is attempting to contact that user via Instant Messaging.

As stated, STB users can have a wide range of online content to choose from. However, no provision is made for preempting the STB video data to signify the arrival and priority of a traditional Internet e-mail 32. During the operation of an STB 10, the TV content normally owns the entire screen, and is not pre-emptive without user interaction. Thus, the screen area belonging to the TV 12 looks quite different from a regular computer with a windowed user interface. Because STBs are intended, in general, to carry one primary video event to a user, there is not much need for separate screen partitions or divisions of the screen area. Consequently, STBs do not normally make provision for dividing the screen, or any other complex video management involving dedicating a portion of the screen to a specific event not related to the primary video datastream.

Furthermore, conventional Internet e-mail accounts that are not sold with STB services are difficult if not impossible to be accessed from a STB 12. Thus, such a conventional STB 10 cannot notify the user of an arrival of an Internet e-mail 32 from a non-STB e-mail account. Additionally, a conventional STB 10 lacks the sophistication necessary to notify the user of the arrival of an Internet e-mail 32 which satisfies user-specified e-mail filter criteria 36.

Finally, when a new STB 10 is added to an ISP 15, it must be initialized. To initialize a STB 10, the STB 10 must be provided with the programming required to allow it to function within the specific ISP 15 to which it is connected and to thereby provide the services for which the subscriber has paid. Additionally, as the TV provider 14 and its accompanying services evolve, the STB 10 must also evolve to continue providing subscribers with as many of these services as possible. Such an evolution will primarily involve changes to the programming, and perhaps a re-initialization, of the STB 10.

In order to initialize a new STB 10 or upgrade the programming in an existing STB 10, it is preferable to transmit the necessary programming to the STB 10 via the TV provider 14 network. Otherwise, a technician must visit each subscriber to install or upgrade the STB 10. Such field installations and upgrades would obviously be at significant expense. Software that is provided to the population of STBs could be downloaded through the ISP 15, or through the TV provider 14. However, such a download requires that the STB 10 contain some intelligence in order to properly react to and manage such a download. This is because there are many different versions and capabilities of STBs in existence, and it is important to be able to determine which STBs can support which levels of software.

Thus, there is a need for an STB that can notify users of the arrival of certain e-mail messages, where that notification occurs as a result of user-specified filter criteria and that an e-mail account exists outside of the STB arrangement. Also, there is a need for a STB to notify a user of the arrival of such e-mail by using a portion of a TV screen. Finally, because there are many different types of STBs in existence, there is a need for a way of downloading new STB applications that can determine the capabilities of a particular STB so that the appropriate application can be downloaded thereto.

SUMMARY OF THE INVENTION

It is an object of the present invention to meet the above-described needs and others. Specifically, it is an object of the present invention to query and filter e-mails and notify a user of their arrival via a Set Top Box connected to a TV.

To achieve these stated and other objects, the present invention is embodied and described as a software application residing on a STB which queries an e-mail server and notifies a user that an e-mail message fulfilling specific filter criteria has arrived. In a preferred embodiment, the e-mail filtering and notification application resides on a Set Top Box (STB) which is connected between a TV content provider, an Internet provider having an e-mail server, and a TV; a software program resident on the STB which allows a user to specify e-mail filter criteria and notification icons which then retain and store those criteria and icons. The software program preferably includes a querying module which queries the e-mail server to determine whether e-mail fulfilling the user-specified criteria has arrived at the e-mail server, and upon arrival of an e-mail fulfilling the criteria, the application notifies the user by posting the notification icons to the STB.

The application may also either continually or occasionally query the e-mail server, and may run on top of either a multi-tasking or a single-tasking Operating System (O/S). In the single-tasking case, the application remains in memory as a Terminate and Stay Resident (TSR) program and runs intermittently at specifically timed intervals.

The application may also notify the Set Top Box user via an icon on the TV screen, where the notification icon is configurable by the user, and can reflect the content of the targeted e-mail. Alternatively, the application can notify the STB user through the use of a tone generated through the TV speaker, where the tone is configurable by the user, and can reflect the content of the targeted e-mail. The application can also notify the STB user of more than one e-mail messages, where each message satisfies different criteria and has different notification icons.

The application can also query the e-mail server upon power up of the STB, and then immediately notify the user of the existence of e-mails satisfying the user-specified criteria. Alternatively, the application can notify the user by use of a pager rather than through the STB. Also, the application can notify the user of the existence of a telephone call with Caller ID instead of an e-mail message, or can notify the user that another user is attempting to make contact using Instant Messaging.

Furthermore, updated versions of the application can be downloaded to the STB by said Internet provider, where that downloading of newer versions can distinguish between different types of STBs.

The application can also be resident on the e-mail server rather than the STB, or resident on a middle or intermediate server.

The present invention also encompasses the methods of implementing and operating the application described above. For example, the present invention expressly includes a method of filtering e-mail messages and notifying a user by installing a software program on a STB, wherein the STB is connected both to a TV content provider and an e-mail server; configuring that program with specific e-mail criteria and notification symbols; queuing incoming e-mail messages at the e-mail server; querying the e-mail server as to whether any of the queued messages fulfill the criteria; and notifying a user that e-mail messages fulfilling the criteria are available on the e-mail server.

The present invention also encompasses the means of implementing and operating the application described above. For example, the present invention expressly includes an e-mail filtering and notification application including a STB, connected among a TV content provider, an Internet provider having an e-mail server, and a TV; user-input means for allowing a user to specify e-mail filter criteria and notification icons; retaining and storing means for retaining and storing the criteria and icons; querying means, for querying the e-mail server to determine whether e-mail fulfilling the user criteria has arrived at the e-mail server; and notification means for notifying the user of the arrival by posting the notification icons to the STB.

Additional objects, advantages and novel features of the invention will be set forth in the description which follows or may be learned by those skilled in the art through reading these materials or practicing the invention. The objects and advantages of the invention may be achieved through the elements disclosed and recited in the attached claims.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Hardware Architecture of an STB

Figure 4:
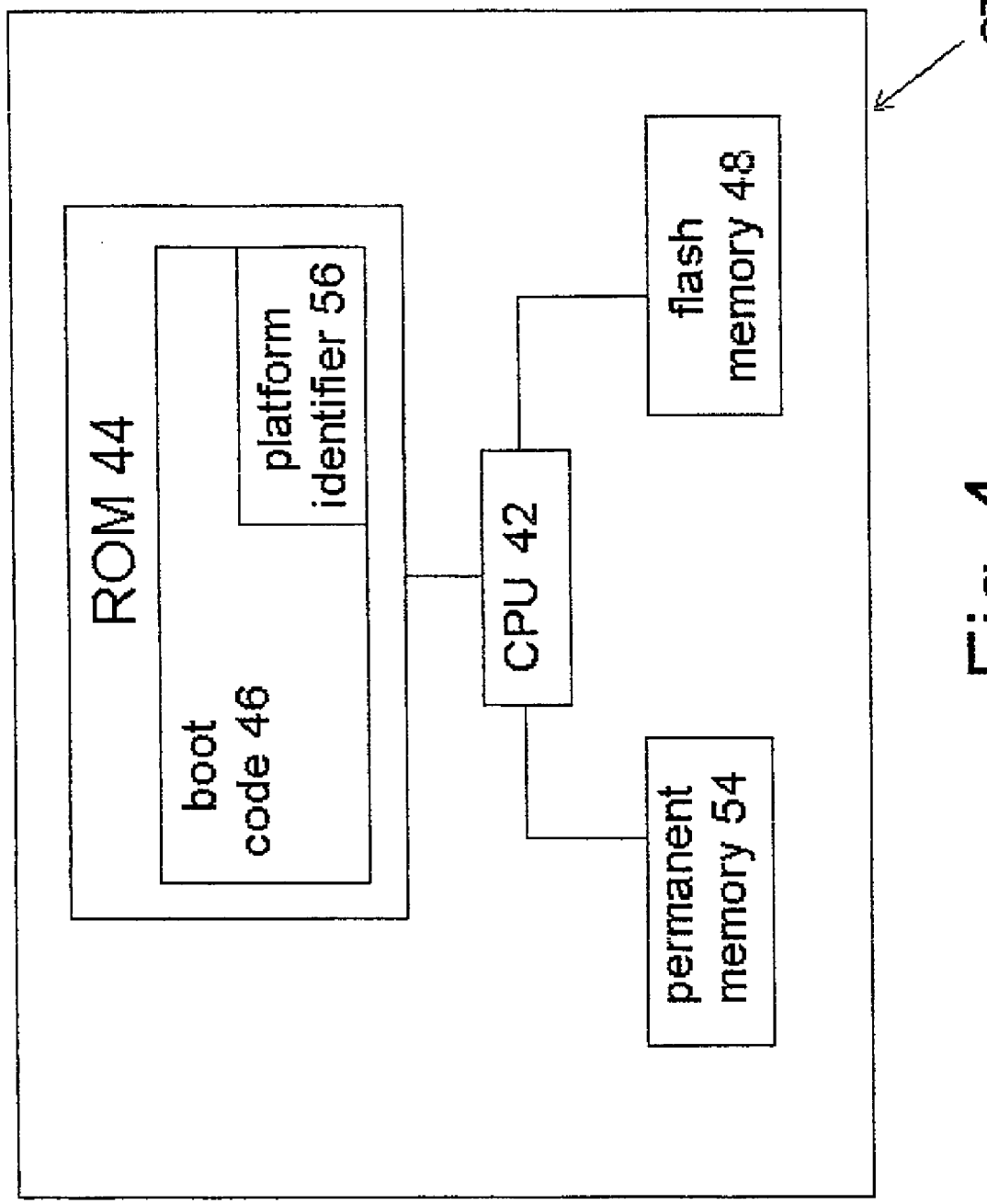
FIG. 4 is a plan view of the hardware within a STB used with the present invention.

FIG. 4 illustrates the hardware layout of a typical STB 10 used with the present invention, including a Central Processing Unit (CPU) 42 and the three different types of memory in an STB 10. These three different types of memory include a read-only memory unit (ROM) 44, a flash memory unit 48, and a random access memory unit (RAM) 54.

The ROM 44 contains the boot code 46 and platform identifier 56. Boot code 46 will be explained in the "Software Architecture of an STB" section below. Many different varieties of STBs exist, with widely varying technical capabilities. Because of this, each STB 10 preferably contains a platform identifier 56 that is specific to the type, architecture and capabilities of that particular STB 10.

A flash memory unit 48 contains the base platform code 50 and the Operating System (O/S) code 52. The RAM unit 54 can use disc storage or some other type of permanent storage. Downloaded software objects such as the base platform code 50, the O/S code 52, and so forth may be temporarily stored in the permanent memory or the RAM 54, and then transferred from the RAM 54 to the flash memory unit 48 for longer-term storage. It is advantageous to store the O/S code 52 and applications in the flash memory 48, rather than the RAM 54, because the flash memory 48 can be accessed more quickly.

Software Architecture of an STB

Figure 5:
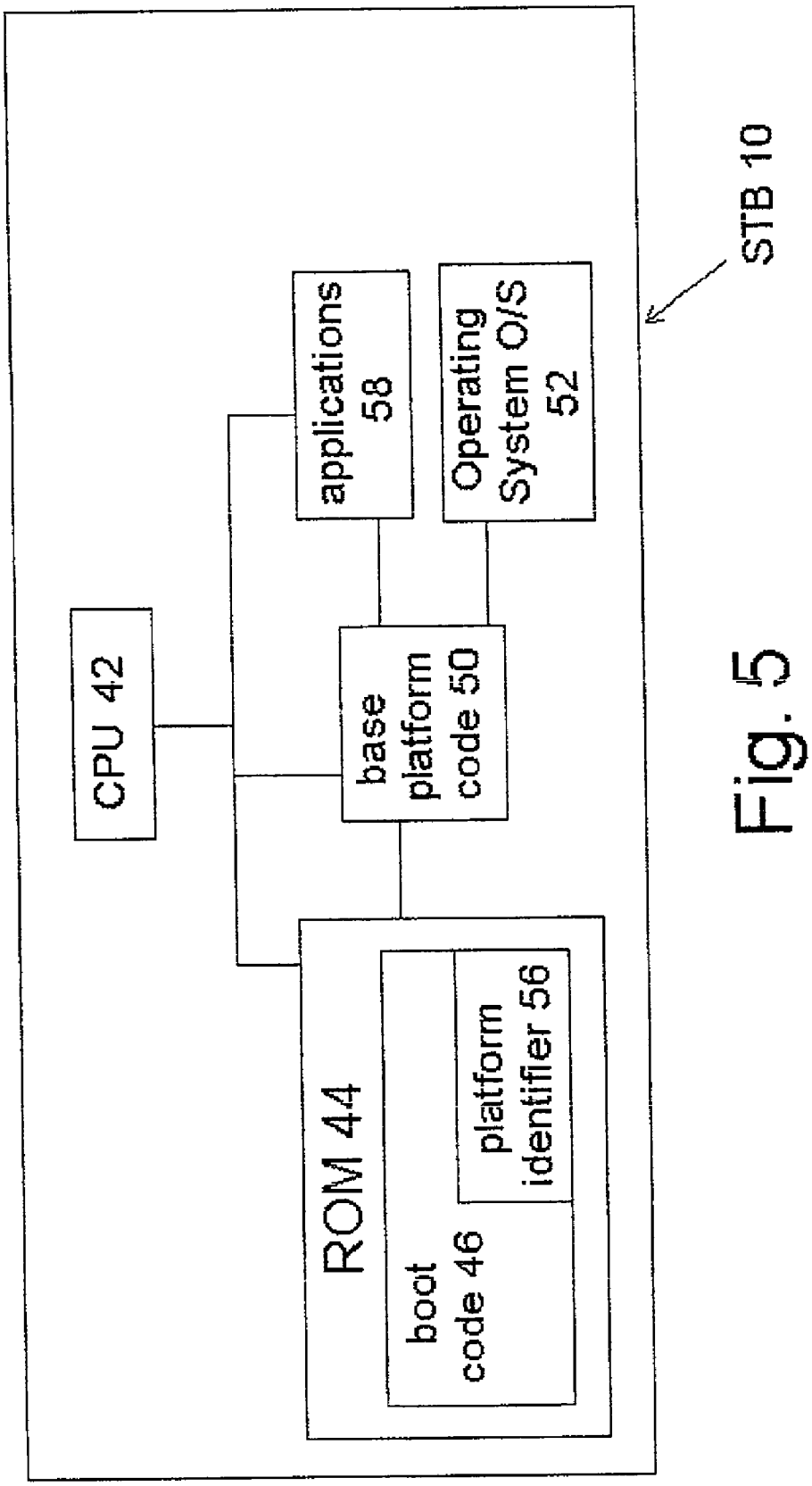
FIG. 5 is a plan view of the software within a STB used with the present invention.

As shown in FIG. 5, there are four general tiers or classifications of software that run on or have control of the STB 10 during its different stages in the initialization and operation. The four tiers are the boot code 46, the base platform code 50, the O/S code 52, and the application code 58.

Referring to FIG. 5, the first classification of code is the boot code 46, which resides in the STB 10 preferably in the read-only memory (ROM) 44, and can automatically execute and initialize or re-initialize the STB 10. The boot code 46 and platform identifier 56 are shown in both FIG. 4 (STB hardware) and FIG. 5 (STB software) because they are a hybrid combination of the two, perhaps better described as firmware. The boot code 46 will preferably be automatically executed by the central processor 42 of the STB 10. Execution of the boot code 46 may be triggered by and immediately follow connection of power to the STB 10, or can be triggered by the user. The present invention can also require connection to the TV content provider 14 before an execution of the boot code is triggered. While the boot code 46 is executing, no action by the user/installer should be required.

As shown in FIG. 5, the ROM 44 which is factory-installed in the STB 10 will also include a platform identifier 56 that is specific to the type, architecture and capabilities of the STB 10. When running, the boot code 46 will attempt to match software-download information with the platform identifier 56. Thus, the boot code 46 can determine whether a transport stream from either TV provider 14 or the ISP 15 is appropriately targeted for the correct STB 10.

While running the boot code 46, the STB 10 cannot provide any services to the subscriber. One function of the boot code 46 is to search the datastream received from the TV provider 14 to locate, acquire and begin execution of the base platform code 50 which is the next tier or classification of programming. If the boot code 46 cannot find the base platform code 50 within the STB storage 48 or 54, the boot code 46 will search the data transport stream from the provider facility 14 for the base platform code 50.

As will be understood by those skilled in the art, the platform identifier 56 of the present invention can be used to check any type of code object for its compatibility with the STB 10. The platform identifier 56 is not limited to use by the boot code 46 only. The platform identifier 56 can also be used by the base platform code 50 to identify and acquire an O/S code 52 or applications 58 object designed for downloading to a particular STB 10.

The base platform code 50 has two functions. The first function is to provide the basic capability of allowing a subscriber to watch programming from the TV provider 14. The second function is to control the download of the next classification of code objects, i.e., the target O/S code 52, and resident applications 58. The base platform code 50, while allowing subscribers to watch TV programming, does not generally support any additional functions of the STB 10. However, the base platform code 50 can acquire, authenticate, authorize and execute objects of the third and fourth classifications of programming, the O/S code 52 and applications 58.

When the base platform code 50 begins executing, the execution of the boot code 46 is completed and control of the STB 10 passes to the base platform code 50. The base platform code 50 may be factory loaded, but is preferably transmitted to the STB 10 from the TV provider 14 during the initialization of the STB 10. This allows the TV provider 14 to customize the base platform code 50 for optimal operation on the specific provider system where the STB 10 is deployed.

Figure 1:
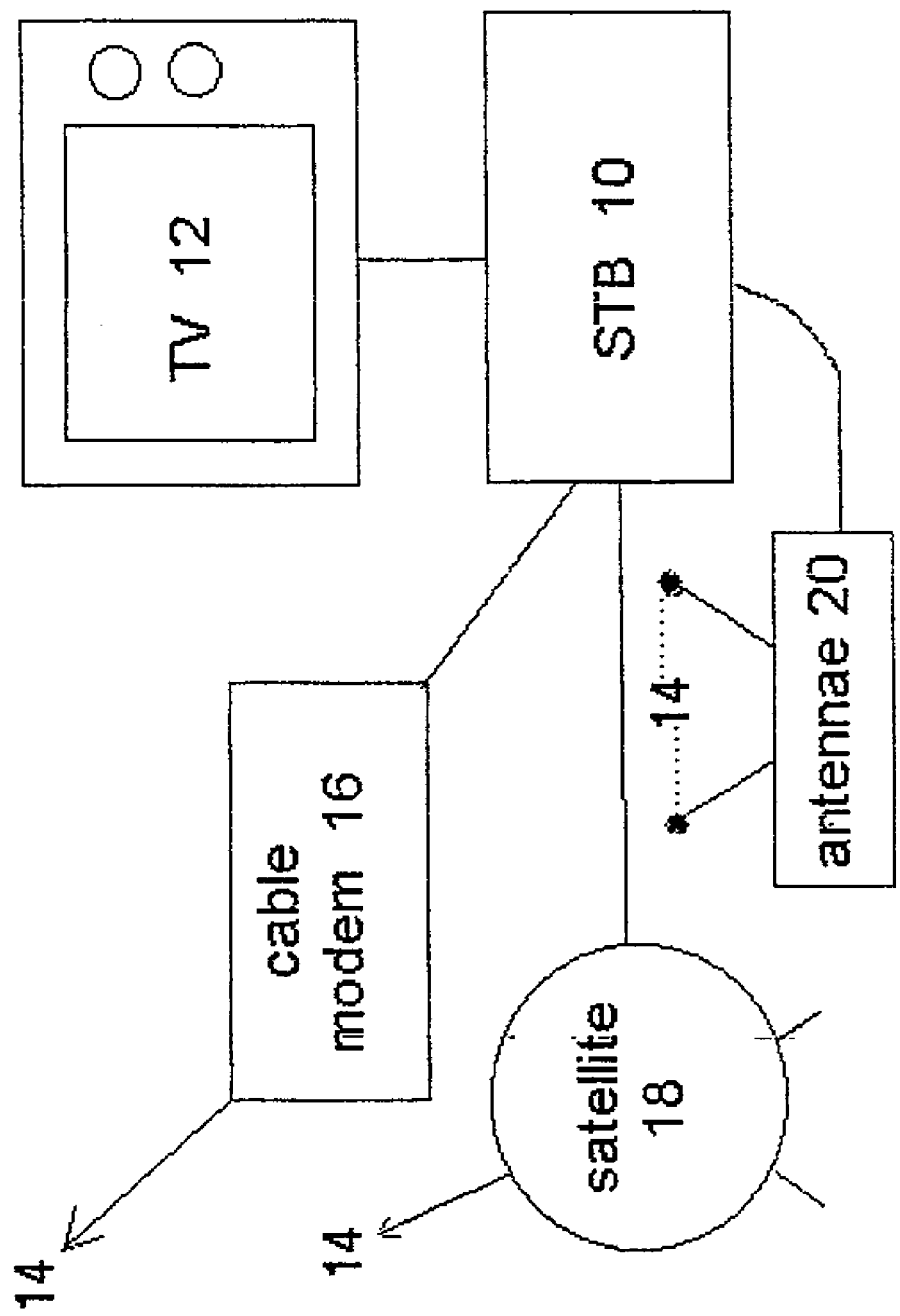
FIG. 1 is a plan view of a conventional STB connected between a TV and a TV content provider.
Figure 2:
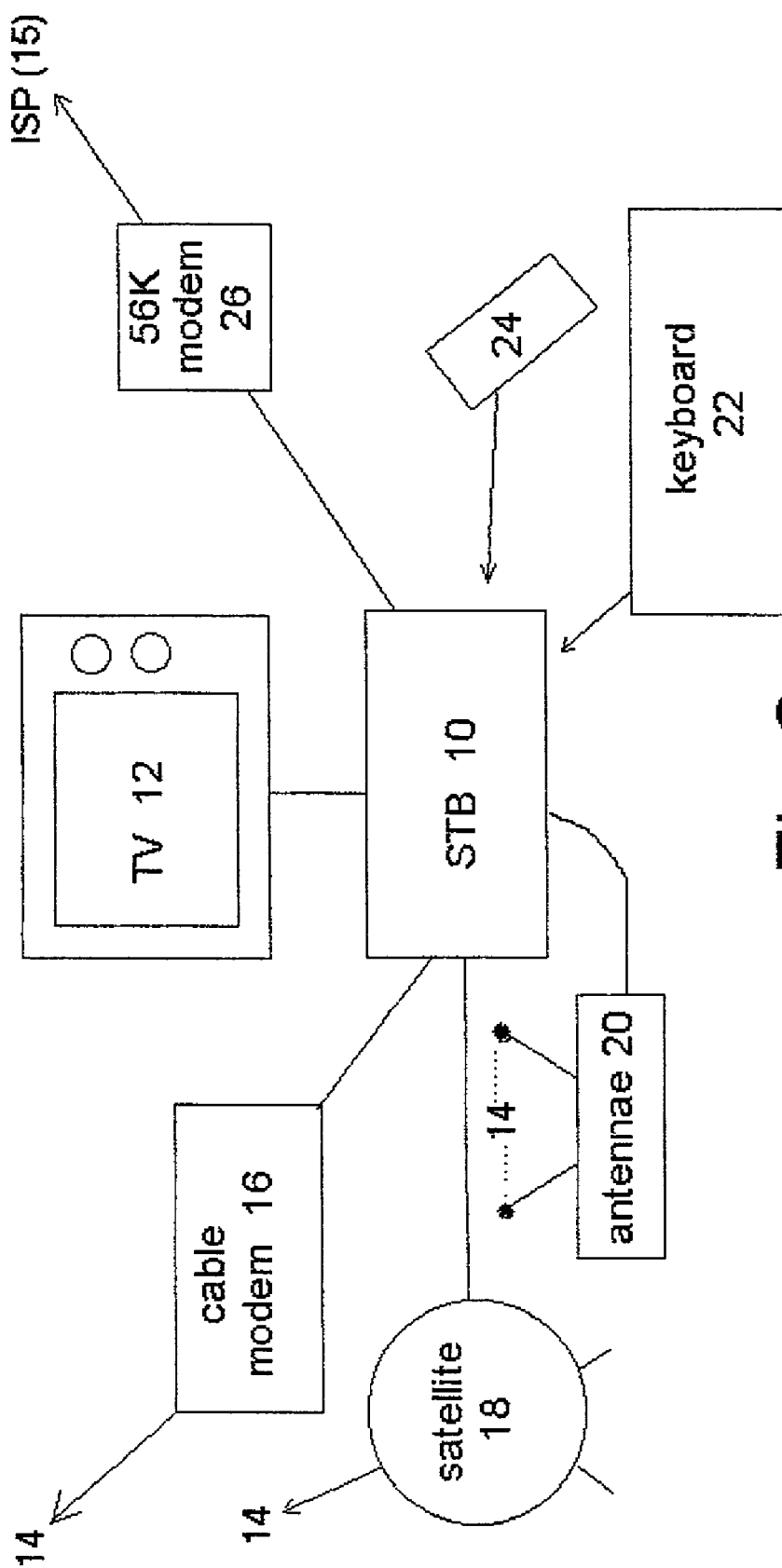
FIG. 2 is a plan view of a STB configuration which incorporates Internet services.
Figure 3:
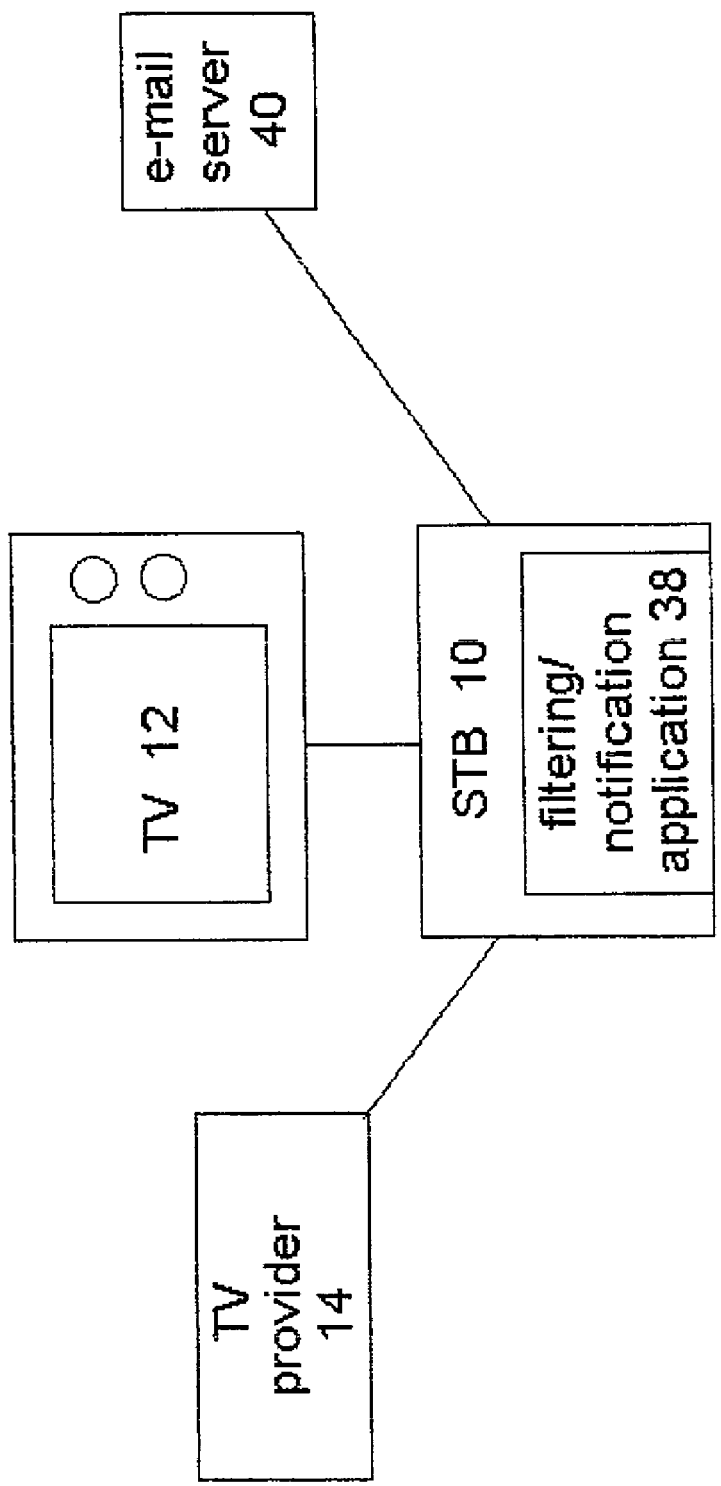
FIG. 3 is a plan view of a STB running the software according to the present invention, connected between an e-mail server and a TV content provider.

The O/S code 52 and resident applications 58 provide the additional STB functions available from the TV provider 14, including the filtering/notification application 38 of the present invention. The O/S code 52 can be proprietary software from a third party (such as Microsoft's WinCE™) that provides an interface to the STB used by the resident applications 58. In the present invention, the O/S code 52 can be either of the multi-tasking or single-tasking variety. In the single tasking case, the filtering/notification application 38 can be stored in the STB's flash memory 48, similar to a Terminate-and-Stay-Resident (TSR) program. At scheduled times, the application 38 can be "woken up", where it will then query the e-mail server 40, which holds the actual e-mails as shown in FIG. 3.

The other STB O/S alternative is where the O/S code 52 is a multi-tasking type. In such a case, the filtering/notification application 38 can reside in a memory region assigned by the O/S code 52, and can then request the use of the STB system resources from the O/S code 52. At such time as the request is granted, the application 38 can then query the e-mail server 40.

STB applications 58 are software programs that run on top of, and work with, the STB's O/S code 52 to provide the STB capabilities that accompany the watching of television programming. The e-mail filter/notification program 38 of the present invention is such a STB application.

Details of E-Mail Server 40

FIG. 3 shows a STB 10 running the e-mail filtering/notification application 38 of the present invention, connected to an e-mail server 40 and also to a TV content provider 14.

The e-mail server 40 can be using IMAP (Internet Message Access Protocol), which is a standard protocol for accessing e-mail on a local server. IMAP (the latest version is IMAP4) is a client/server protocol wherein e-mail is received and held by a user's e-mail server. Using IMAP, an e-mail client such as an STB 10 can view just the heading and the sender of the letter and then decide whether to download the mail to an e-mail client within an Internet workstation 34. An e-mail client within the Internet workstation 34 can create and manipulate folders or mailboxes on the e-mail server 40, or delete e-mail messages. In the present invention, the e-mail client will also be referred to as an Internet workstation 34, and should not be confused with a STB 10.

Another, less sophisticated e-mail protocol is POP3 (Post Office Protocol 3). With POP3, e-mail is saved in a mail box on the server. When a user reads the mail, all of it is immediately downloaded to the Internet workstation 34 and is then deleted from the e-mail server 40.

Functions of Filtering Application 38

Figure 6:
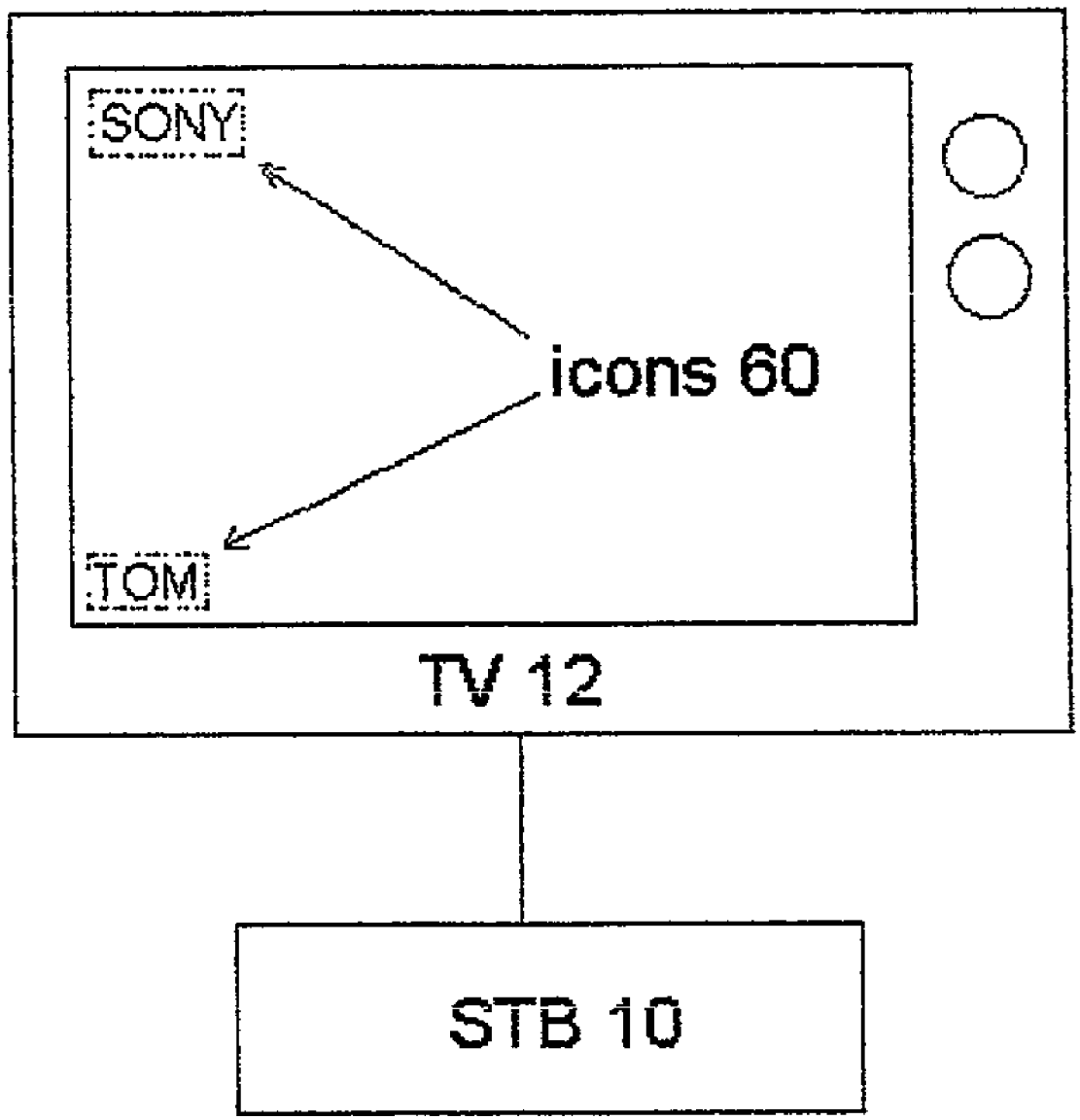
FIG. 6 is an elevational view of a TV screen running the filtering/notification application of the present invention.

As shown in FIG. 6, the e-mail filtering/notification application 38 of the present invention can non-intrusively post a notification of appropriately filtered incoming e-mail 32 to the TV screen 12 upon the e-mail message's arrival at the e-mail server 40. The application 38 does so without interfering with or interrupting the TV provider's content 14, and appropriates only a tiny portion of the TV screen 12 merely to blink a user-customized icon 60 and optionally include an additional color or sound to indicate level of urgency. Alternatively, the filtering/notification application 38 of the present invention can attract the attention of the user independently of the STB 10 such as through use of a pager 62.

An additional alternative exists where the filtering/notification application 38 can notify the user of impending Instant Messages, as well as telephone calls utilizing Caller ID. However, in the remaining portions of this disclosure, the media which are subject to filtering and which then cause notification will be referred to as e-mail messages 32, even though Instant Messages and telephone calls with Caller ID could also trigger user notification.

Figure 7:
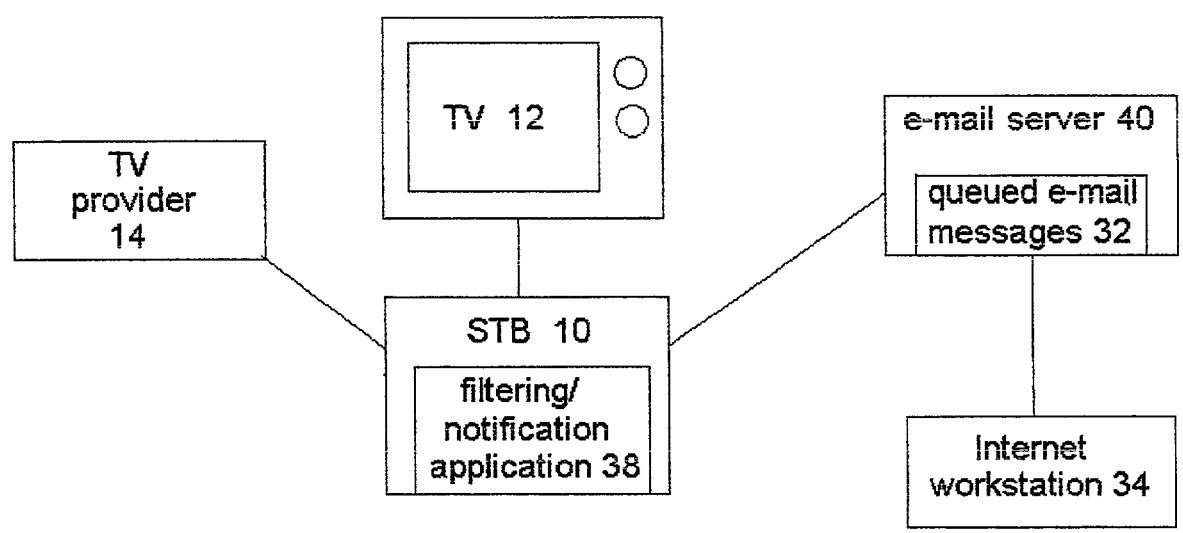
FIG. 7 is plan view of the STB running the filtering/notification application of the present invention connected between a TV provider and an e-mail server.

In all embodiments, the actual e-mail messages 32 themselves do not arrive at and are not viewable from the STB console 10 and TV 12. Instead, as shown in FIG. 7, the e-mails 32, referred to as a queued e-mail message, are staged at the e-mail server 40, where they can then be downloaded to an Internet user's workstation 34. In the first embodiment, the filter criteria 36 designating the types of e-mails of which the user wishes to be notified will reside at the STB 10.

Figure 8:
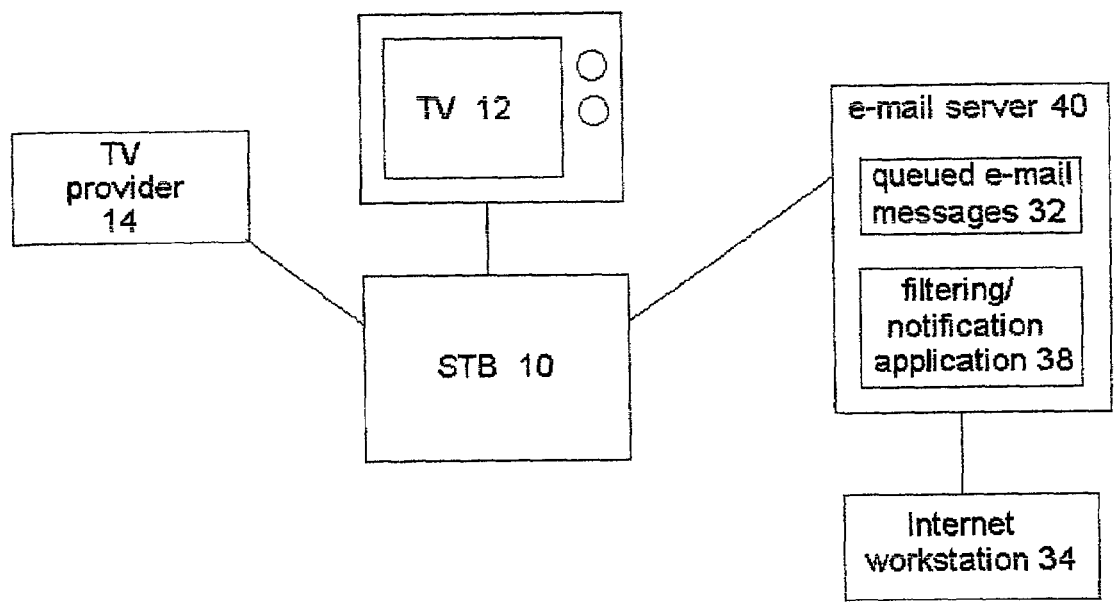
FIG. 8 is plan view of the STB connected to a TV provider and to an e-mail server, where the filtering/notification application of the present invention resides on the e-mail server.

However, the present invention has two other embodiments. The second embodiment has the filtering/notification application 38 residing on the e-mail server 40, not on the STB 10, as shown in FIG. 8. In this embodiment, the user-customized icons are posted to the screen of the TV 12 by the e-mail server 40 instead of by the STB 10.

Figure 9:
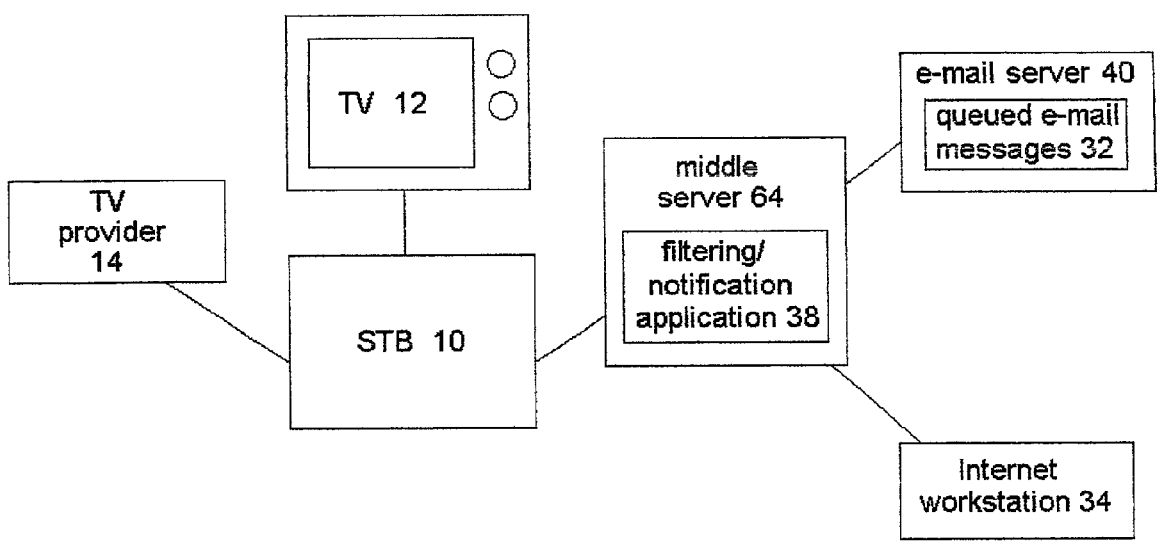
FIG. 9 is a plan view of the STB connected between a TV provider and a middle server, wherein the middle server is also connected to an e-mail server, where the filtering/notification application of the present invention resides on the middle server.

A third embodiment is one in which the filtering/notification application 38 resides on a middle server 64, located between the STB 10 and the e-mail server 40, as shown in FIG. 9. A middle server 64 is advantageous where the e-mail server 40 is running a POP3 protocol. This is because in a POP3 server, all e-mails 32, even those not fulfilling the filter criteria 36 specified by the user, are downloaded and removed from the e-mail server 40 whenever touched by the client. Thus, a middle server 64 acts as an intermediary to prevent e-mail messages 32 that are touched, but do not fulfill filter criteria 36, from being erased altogether.

In the embodiment in which the user-configured e-mail filtering/notification application 38 resides on the STB 10, the application 38 can poll the e-mail server 40, either continuously or at selected times, querying whether any e-mail messages 32 fulfilling the user's filter criteria 36 have arrived.

How often the application 38 polls the e-mail server 40 depends on the type of connection therebetween. If the connection between the STB 10 and e-mail server 40 is a permanent one such as a DSL or an ISDN, the filtering/notification application 38 can repeatedly query the e-mail server 40 and apply the filter criteria 36 to any messages queued therein. Otherwise, if the connection is an occasional-use type, such as a dial-up connection over POTS (Plain Old Telephone Service), the filtering/notification application 38 can originate a telephone call to the e-mail server 40 at a low call-volume time, such as 2 A.M. The filtering/notification application 38 can then apply the filter to any e-mail messages on the e-mail server 40 that are queued up for delivery. Cable modems 16 fit somewhere 'inbetween' permanent and occasional STB/e-mail server connections. This is because some cable TV providers 14 are only equipped to transmit data in one direction, from the provider 14 to the user (downstream). These TV providers 14 require a telephone line for any instance where it is necessary to transmit data from the user to the TV provider 14 (upstream). Other cable TV providers 14 are equipped to allow for the movement of data both downstream and upstream without requiring an additional telephone line.

Icons 60

Regardless of the type of connection, upon receipt of an e-mail message 32 that passes all filter criteria 36, the application 38 begins posting a blinking icon 60 signifying the presence of such an e-mail message (see FIG. 6). In the event the STB 10 is not in use at the time the filter criteria are passed, the filtering/notification application 38 could begin posting a blinking icon 60 or play a sound file whenever the STB 10 is activated by the user.

The user can, when inputting the filter criteria 36, also customize the On-Screen Display (OSD) software 30 to display data or icons 60 related to the subject matter, or play an audible tone or customized sound file. Notification icons 60 could, as shown in FIG. 6 for example, incorporate the word "Sony" (suggesting e-mail from an employer) or incorporate the word "Tom" (suggesting e-mail from a personal acquaintance).

Setting Up STB Software

There are two distinct phases of programming an STB 10. The first is the initial programming of the STB 10. The second is upgrading the programming or re-initialization of the STB 10 after that STB 10 has been placed in service. This section will discuss the first, initial programming of the STB 10.

The boot code 46 is preferably factory-loaded in the read-only memory (ROM) of the STB 10 and is executed as soon as AC power is provided, but may also be triggered by the user. Whenever executed, the boot code 46 acquires and loads the base platform code 50, which may be obtained from the TV provider 14 or may be factory-loaded along with the boot code 46.

The base platform code then acquires the O/S code 52. The base platform code 50 is not limited, however, to acquiring the O/S code 52 and other software objects only when first executed. Additionally, base platform code 50 can acquire O/S code 52 while loaded and running. One way this can occur is in response to an initialization message from the TV provider 14.

Upgrading STB Software

As the TV provider 14 and ISP 15 services evolve, the STB 10 configuration must also evolve. This STB evolution will primarily involve changes to the O/S code 52 and applications 58, and perhaps a re-initialization of the STB 10. By upgrading the software, such as the filtering/notification application 38 described herein, a STB 10 can be made to perform more efficiently or offer new services as the TV provider 14 services evolve.

Additionally, each STB 10 should be periodically re-programmed or upgraded to continue to function optimally within the evolving TV provider 14 network. Each time the programming of an STB 10 is changed, including the filtering/notification application 38 of the present invention, any new code must be appropriate to the architecture and capabilities of that STB 10. The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An apparatus for filtering electronic mail and notifying a user, residing in a set top box connected between a television content provider, an Internet provider having an e-mail server, and a television, comprising:
    a software program application which enables a user to specify e-mail filter criteria and a notification icon which then retains and stores said e-mail filter criteria and said notification icon;
    a querying module contained within said software program application which queries said e-mail server to determine whether any e-mail fulfilling said e-mail filter criteria is among a plurality of e-mails for the user that have arrived at said e-mail server; and
    a notifying module also contained within said software program application,
    wherein, upon arrival of an e-mail fulfilling said e-mail filter criteria, said software program application notifies the user by posting said notification icon to the set top box.

2. An apparatus as in claim 1, wherein
    the connection between said set top box and said e-mail server is permanent, so that said software program application continually queries said e-mail server.

3. An apparatus as in claim 1, wherein
    the connection between said set top box and said e-mail server is non-permanent, so that said software program application queries said e-mail server at specific timed intervals.

4. An apparatus as in claim 1, wherein
    said set top box contains a multi-tasking Operating System and said software program application runs on top of said Operating System.

5. An apparatus as in claim 1, wherein
    said set top box contains a single-tasking Operating System and said software program application remains in memory as a Terminate and Stay Resident program and runs intermittently at user-configurable intervals.

6. An apparatus as in claim 1, wherein
    said software program application further includes means for notifying the user of the existence of e-mail messages fulfilling said e-mail filter criteria through said notification icon on the television screen.

7. An apparatus as in claim 6, wherein
    said notification icon is configurable by the user, and reflects the content of the e-mail filter criteria.

8. An apparatus as in claim 6, wherein
    said notifying means notifies the user of a plurality of said e-mail messages wherein each e-mail message satisfies different filter criteria and has a different user notification icon.

9. An apparatus as in claim 1, wherein
    said software program application further includes means for notifying the user through the use of a tone generated through the television speaker.

10. An apparatus as in claim 9, wherein
    said tone is configurable by the user, and reflects the content of the e-mail filter criteria.

11. An apparatus as in claim 1, wherein
    said software program application further includes means for querying said e-mail server upon power-up of said set top box, and immediately notifies the user of the existence of any e-mail messages satisfying the user-specified e-mail filter criteria.

12. An apparatus as in claim 1, wherein
    said software program application notifies the user via a pager rather than through said set top box.

13. An apparatus as in claim 1, wherein
    said software program application notifies the user of the existence of a telephone call with Caller ID satisfying said e-mail filter criteria, instead of an e-mail message.

14. An apparatus as in claim 1, wherein
    said software program application notifies the user of another user attempting to make Instant Message contact with the user.

15. An apparatus as in claim 1, wherein
    newer versions of said software program application are downloaded to said set top box by said Internet provider.

16. An apparatus as in claim 15, wherein
    said downloading of newer versions can distinguish between different types of set top boxes, and make adjustments to the content of said download accordingly.

17. An apparatus as in claim 1, wherein
    said software program application is not resident on said set top box, but is resident on said e-mail server.

18. An apparatus as in claim 1, wherein
    said set top box is connected to said e-mail server through a middle server, where said software program application is resident on said middle server.

19. An e-mail filtering and notification apparatus, comprising:
    set top box, connected between a TV content provider, an Internet provider having an e-mail server, and a TV;
    user-input means for allowing a user to specify e-mail filter criteria and a notification icon;
    retaining and storing means for retaining and storing said criteria and said notification icon;
    querying means, for querying said e-mail server to determine whether any e-mail fulfilling said e-mail filter criteria is among a plurality of e-mails for the user that have arrived at said e-mail server; and
    notification means for notifying the user of said arrival by posting said notification icon to the Set Top Box, wherein said notification icon relates to the subject matter of said arriving e-mail.

20. A computer readable medium for filtering electronic mail and notifying a user, residing on a set top box connected between a television content provider, an Internet provider having an e-mail server, and a television, comprising:

a software program application that enables a user to specify e-mail filter criteria and a notification icon which then retains and stores said e-mail filter criteria and said notification icon;

a querying module that queries said e-mail server to determine whether any e-mail fulfilling said e-mail filter criteria is among a plurality of e-mails for the user that have arrived at said e-mail server; and a notifying module wherein, upon arrival of an e-mail fulfilling said criteria, said software program application notifies the user by posting said notification icon to the set top box.

* * * * *